United States Patent
Pai et al.

(10) Patent No.: US 12,231,340 B2
(45) Date of Patent: Feb. 18, 2025

(54) EDGE DEVICE FOR TELEMETRY FLOW DATA COLLECTION

(71) Applicant: Juniper Networks, Inc., Sunnyvale, CA (US)

(72) Inventors: Raghuram Malpe Pai, Bangalore (IN); Nilesh Kantilal Simaria, Kanata (CA); Harsha Lakshmikanth, Bangalore (IN); Sri Ram Sankar, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/649,263

(22) Filed: Jan. 28, 2022

(65) Prior Publication Data

US 2023/0179525 A1 Jun. 8, 2023

(30) Foreign Application Priority Data

Dec. 2, 2021 (IN) .............................. 202141055838

(51) Int. Cl.
*H04L 47/125* (2022.01)
*H04L 43/04* (2022.01)
*H04L 43/0864* (2022.01)

(52) U.S. Cl.
CPC ............ *H04L 47/125* (2013.01); *H04L 43/04* (2013.01); *H04L 43/0864* (2013.01)

(58) Field of Classification Search
None
See application file for complete search history.

(56) References Cited

U.S. PATENT DOCUMENTS

| | | | |
|---|---|---|---|
| 10,516,761 B1 | 12/2019 | A et al. | |
| 11,088,929 B2 | 8/2021 | Kulshreshtrha et al. | |
| 11,140,029 B1 | 10/2021 | Singhal et al. | |
| 11,223,516 B1* | 1/2022 | Singhal | G06F 11/0709 |
| 11,245,538 B2* | 2/2022 | Doshi | G06F 9/505 |
| 11,271,843 B1* | 3/2022 | Cady | H04L 67/568 |
| 2020/0028756 A1* | 1/2020 | Hale | H04L 41/0266 |
| 2020/0322233 A1 | 10/2020 | Gao et al. | |
| 2021/0021484 A1* | 1/2021 | Sood | H04W 12/122 |

(Continued)

FOREIGN PATENT DOCUMENTS

| | | | |
|---|---|---|---|
| CN | 111327681 A | 6/2020 | |
| EP | 3336697 A1 * | 6/2018 | G06F 8/60 |

(Continued)

OTHER PUBLICATIONS

Bjorklund et al., "Yang—A Data Modeling Language for the Network Configuration Protocol (NETCONF)", Internet Engineering Task Force (IETF), RFC6020, Oct. 2010, 173 pp.

(Continued)

*Primary Examiner* — Schquita D Goodwin
*Assistant Examiner* — Ishrat Rashid
(74) *Attorney, Agent, or Firm* — Shumaker & Sieffert, P.A.

(57) ABSTRACT

A device comprises processing circuitry configured to configure an edge device to collect telemetry flow data output by a plurality of network devices and to generate processed telemetry flow data based on the collected telemetry flow data. The processing circuitry is further configured to receive the processed telemetry flow data from the edge device and store an indication of the processed telemetry flow data.

18 Claims, 6 Drawing Sheets

(56) References Cited

U.S. PATENT DOCUMENTS

| | | | | |
|---|---|---|---|---|
| 2021/0144517 A1* | 5/2021 | Guim Bernat | ........ | H04L 9/0637 |
| 2021/0409294 A1* | 12/2021 | Chitalia | .................. | H04L 43/20 |
| 2022/0334725 A1* | 10/2022 | Mertes | .................. | G06F 16/275 |
| 2023/0164041 A1* | 5/2023 | Marshall | ................. | H04L 43/08 |
| | | | | 709/224 |

FOREIGN PATENT DOCUMENTS

| | | | | |
|---|---|---|---|---|
| EP | 3849154 A1 | 7/2021 | | |
| KR | 20210149576 A * | 12/2021 | ............. | H04L 67/51 |
| WO | WO-2021034428 A2 * | 2/2021 | ............. | H04L 41/04 |

OTHER PUBLICATIONS

Enns et al., "NETCONF Configuration Protocol", Network Working Group, RFC4741, Dec. 2006, 95 pp.

Enns et al., "Network Configuration Protocol (NETCONF)", Internet Engineering Task Force (IETF), RFC6241, Jun. 2011, 113 pp.

Harrington et al., "An Architecture for Describing Simple Network Management Protocol (SNMP) Management Frameworks", Network Working Group, RFC3411, Dec. 2002, 64 pp.

U.S. Appl. No. 17/449,067, filed Sep. 27, 2021, naming inventors Pai et al.

U.S. Appl. No. 17/456,105, filed Nov. 22, 2021, naming inventors Marshall et al.

Extended Search Report from counterpart European Application No. 22209430.2 dated Mar. 14, 2023, 8 pp.

Response to Extended Search Report dated Mar. 14, 2023, from counterpart European Application No. 22209430.2 filed Dec. 6, 2023, 13 pp.

* cited by examiner

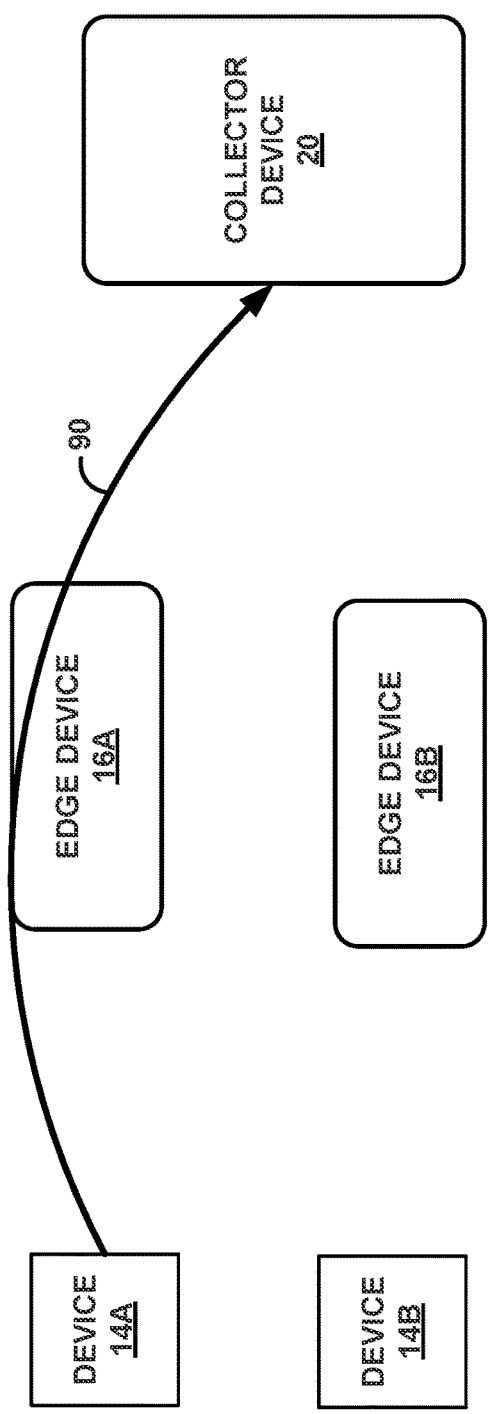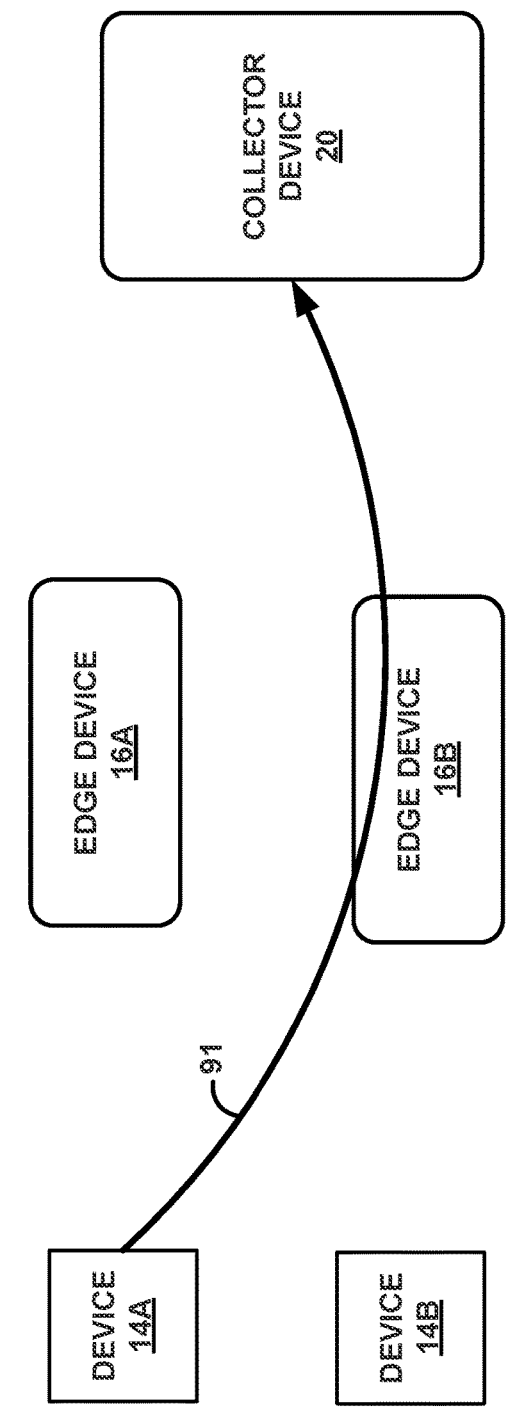

EDGE DEVICE FOR TELEMETRY FLOW DATA COLLECTION

This application claims the benefit of IN Provisional Patent Application No. 202141055838, filed 2 Dec. 2021, the entire contents of which is incorporated herein by reference.

TECHNICAL FIELD

This disclosure relates to computer networks, and more particularly, to managing network devices.

BACKGROUND

Network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

SUMMARY

In general, this disclosure describes techniques to perform metric collection with high availability (HA), particularly in applications where data centers span large geographical distances. For example, an edge device geographically proximate to network devices may be configured to perform one or more of filtering, aggregation, or compression of telemetry flow data, which may help to minimizes an up link utilization and/or saturation. Further, in some examples, a collector device may perform "intelligent" collection placement of services at a closest edge device. While this example refers to flow data, techniques described herein may apply to various telemetry mechanisms, such as, for example, NetFlow, JTI Native Telemetry, OpenConfig, SNMP, Syslog, or another telemetry mechanism.

In one example, a method includes configuring, by a collector device, an edge device to collect telemetry flow data output by a plurality of network devices and to generate processed telemetry flow data based on the collected telemetry flow data. The method further includes receiving, by the collector device, the processed telemetry flow data from the edge device. The method further includes storing, by the collector device, an indication of the processed telemetry flow data.

In another example, a device includes a datastore and processing circuitry. The processing circuitry is configured to configure an edge device to collect telemetry flow data output by a plurality of network devices and to generate processed telemetry flow data based on the collected telemetry flow data. The processing circuitry is further configured to receive the processed telemetry flow data from the edge device and store an indication of the processed telemetry flow data at the datastore.

In one example, a system comprises an edge device and a collector device. The collector device includes a datastore and processing circuitry. The processing circuitry is configured to configure the edge device to collect telemetry flow data output by a plurality of network devices and to generate processed telemetry flow data based on the collected telemetry flow data. The processing circuitry is further configured to receive the processed telemetry flow data from the edge device and store an indication of the processed telemetry flow data at the datastore.

In one example, a non-transitory computer-readable storage medium includes one or more instructions that cause processing circuitry to configure an edge device to collect telemetry flow data output by a plurality of network devices and to generate processed telemetry flow data based on the collected telemetry flow data. The instructions further cause the processing circuitry to receive the processed telemetry flow data from the edge device and store an indication of the processed telemetry flow data at the datastore.

The details of one or more examples are set forth in the accompanying drawings and the description below. Other features, objects, and advantages will be apparent from the description and drawings, and from the claims.

BRIEF DESCRIPTION OF DRAWINGS

FIG. 4A is a conceptual diagram illustrating an example of an initial selection of an edge device, in accordance with the techniques of the disclosure.

FIG. 4B is a conceptual diagram illustrating an example of an updated selection of an edge device, in accordance with the techniques of the disclosure.

Like reference characters refer to like elements throughout the figures and description.

DETAILED DESCRIPTION

Figure 1:
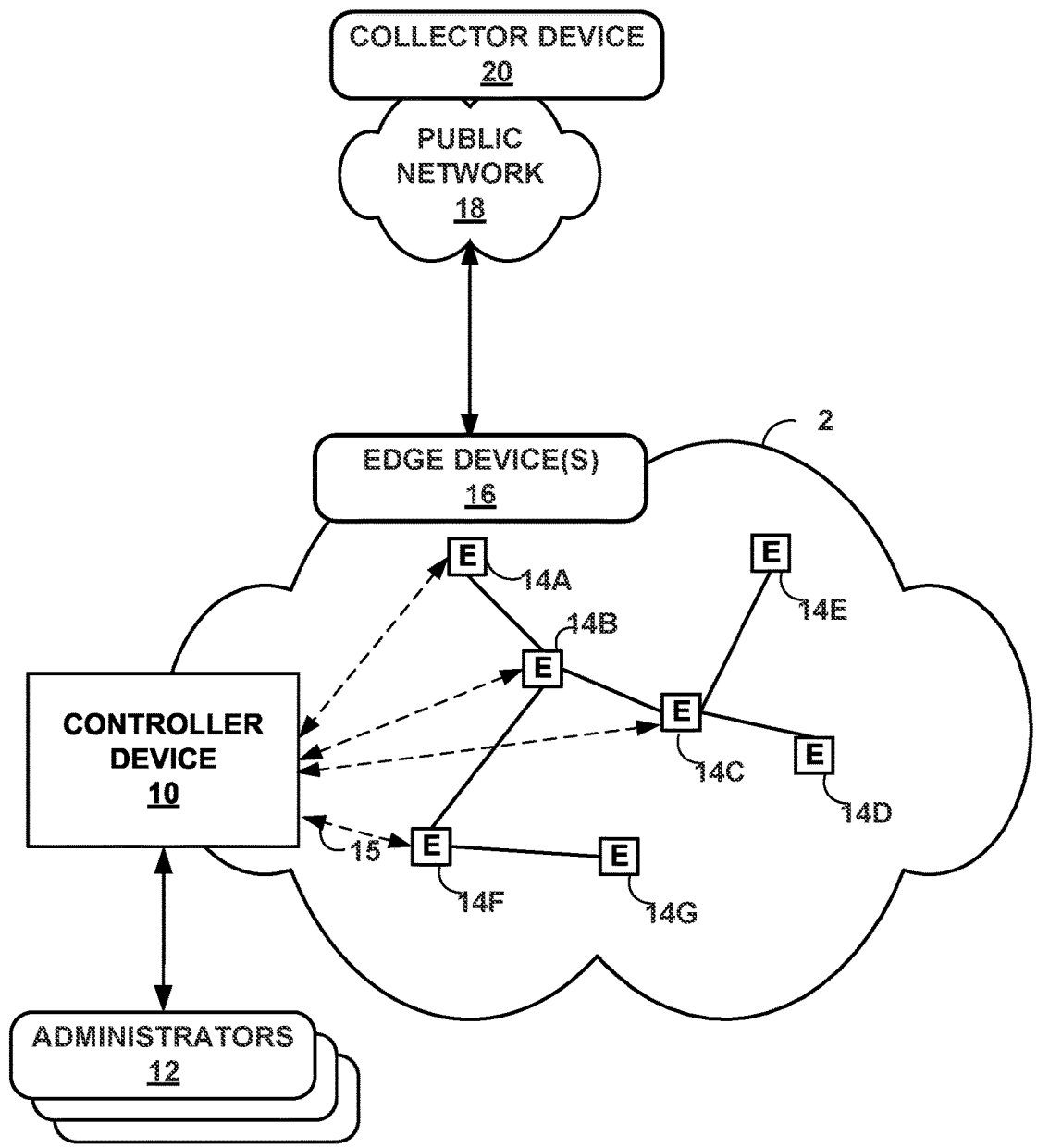
FIG. 1 is a block diagram illustrating an example including network elements of an enterprise network that are managed using a controller device, in accordance with the techniques of the disclosure.

Metric collection may depend on multiple factors, including, for example, the number of sensors, sensor frequency, number of devices (e.g., network devices), cardinality, number of metrics collected, or whether metrics are pulled (e.g., polling) or pushed (e.g., streaming). Vertical scaling (e.g., increasing the processing power of a cloud) may not improve metric collection because metric collection may require increases in processing power over time. In some examples, Kubernetes deployment may provide horizontal scaling. For example, a system may add new nodes to cluster of nodes configured to perform metric collection, which may scale with metric collection.

However, adding nodes to a cluster of nodes may result in the following problems and/or other problems. For example, when a customer deployment spans multiple geographies and/or data centers, the resulting distances between data centers may "stretch" the Kubernetes deployment, which may add latency. The additional latency may be of a magnitude (e.g., latency of greater than 150 ms) that reduces customer satisfaction with metric collection, since the telemetry collection system may appear slow or unresponsive. For instance, an example deployment may collect telemetry from devices in a data center located in Hong Kong and in another data center located in Melbourne. In such an example, the latencies implementing a stretched Kubernetes deployment may reach or even exceed 300 ms.

Some systems avoid the increase in latency of stretching the Kubernetes deployment by using a cloud-based single deployment. For instance, an entire Kubernetes deployment may be geographically proximate (e.g., within a single city and/or data center). However, a cloud-based single deployment may comprise firewall issues and/or telemetry collection failures (e.g., poll based ingest) because of timeouts due to a high round-trip-time (RTT), which may in turn increase load on the devices because of client retries, and/or authentication complexity.

In some examples, the cloud-based single deployment may result in a saturation of an upload link at a customer premise. For example, given that the upload link is used for video conferencing, VoIP, cloud-based e-mail, and other services, it may be desirable that the upload link is not saturated by sending telemetry data. However, 400 devices may use 400*300 kbps=120 MBps of the 1 GBps upload link (which is ~12% of the utilization). Many customers may not have a 1 GBps upload link and may have only half of that, resulting in 25% of the uplink utilization. With NetFlow running on 10% of the 400 devices, the system may use 23.84 MBps*40=953.6 MBps, which by itself may saturate the link.

In some examples, the cloud-based single deployment may result in load balancing (LB) costs. In a pricing example for a network load balancer, a client transferring 1.08 GB of data per hour might be charged, for example, $4.67 per month. Given that a load of 300 KBps per second per device, the load translates to 300 KBps*60*60 per hour=1080000 KB per hour=1.03 GB per hour. This in turn may translate to a cost of $4.45 per device per month. Extrapolating this to 400 devices results in ~$2000 per month. With NetFlow, the costs grow to $14,662 per month for the 40 devices on which NetFlow is monitored. This above calculations do not factor in the additional compute costs involved in filtering this large data on the cloud.

In accordance with the techniques of the disclosure, a system (e.g., a Kubernetes deployment) may be configured to split up a collector pipeline into one or more edge components (e.g., collocated with devices in specific geographical location) and a cloud instance (which may have the rest of the collector pipeline and located in the private cloud or public cloud). In some examples, this mechanism of having an edge component may be configured to identify the source at the collector for streaming sensors. For instance, the edge device may be configured to identify a source, withstand a network address translation (NAT) operation, help to ensure statistical sampling, and support multi-tenancy.

In this disclosure, the edge device may be configured to perform metric collection with high availability (HA), particularly in applications where data centers span large geographical distances. In this example, a cloud may perform "intelligent" collection placement of services at a closest edge device. In this way, techniques described herein may help to reduce or eliminates timeout possibilities. In some examples, each edge device may represent an independent Kubernetes cluster, which may derive benefits of a horizontal scale out. In some examples, the edge device may perform mutual authentication, which may help to address authentication concerns. However, an edge device may be implemented using techniques other than a Kubernetes cluster (e.g., a set of pods), for example, as a virtual machine. Further, as the edge device may perform metric collection based on intelligently placed collection services, there may be little or no firewall issues, little or no cloud related load balancing costs, and telemetry collectors can be dynamically deployed based on need. The edge devices may perform one or more of filtering, aggregation, or compression of telemetry flow data, which may help to minimizes an up link utilization and/or saturation.

FIG. 1 is a block diagram illustrating an example including network devices of an enterprise network 2 that are managed using a controller device 10. Network elements 14A-14G (collectively, "network elements 14" or "network devices 14") of enterprise network 2 include network elements interconnected via communication links to form a communication topology in order to exchange resources and information. Network elements 14 (also generally referred to as network devices) may include, for example, routers, switches, gateways, bridges, bubs, servers, firewalls or other intrusion detection systems (IDS) or intrusion prevention systems (IDP), computing devices, computing terminals, printers, other network devices, or a combination of such devices. Network elements 14 may include one or more sensor devices configured to generate a telemetry packet indicating telemetry data for a plurality of packets output by a respective network element. In some examples, each of network elements 14 may be associated with a respective set of sensor devices that are separate (e.g., a separate circuit board or a separate processing device) from network elements 14. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting network elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content. As shown, public network 18 may provide access to collector device 20. Collector device 20 may represent one or more computing devices (e.g., a server, a computer, or a cloud).

Controller device 10 is communicatively coupled to network elements 14 via enterprise network 2. Controller device 10, in some examples, forms part of a device management system, although only one device of the device management system is illustrated for purposes of example in FIG. 1. Controller device 10 may be an example of a central controller. Controller device 10 may be coupled either directly or indirectly to the various network elements 14. Once network elements 14 are deployed and activated, administrators 12 may use controller device 10 (or multiple such management devices) to manage the network devices using a device management protocol. One example device protocol is the Simple Network Management Protocol (SNMP) that allows controller device 10 to traverse and modify management information bases (MIBs) that store configuration data within each of managed network elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference. Another example device protocol may include NETCONF, however, techniques described herein may be used with other device protocols. Further details of the NETCONF protocol can be found in Enns et al, RFC 6241, "Network Configuration Protocol (NETCONF)," Network Working Group, the Internet Engineering Task Force draft, June 2011, available at https://tools.ietf.org/html/rfc6241, the entire contents of which are incorporated herein by reference.

Controller device 10, also referred to as a network management system (NMS) or NMS device, and network elements 14 may be centrally maintained by an IT group of the enterprise. Administrators 12 interact with controller device 10 to remotely monitor and configure network elements 14. For example, administrators 12 may receive alerts from controller device 10 regarding any of network elements 14, view configuration data of network elements 14, modify the configurations data of network elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrators 12 use controller device 10 or a local workstation to interact directly with network elements 14, e.g., through telnet, secure shell (SSH), or other such communication sessions. That is, network elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of network elements 14, e.g., network element 14F, using controller device 10, to directly configure network element 14F. In this manner, a user can provide commands in a format for execution directly to network elements 14.

Further, administrators 12 can also create scripts that can be submitted by controller device 10 to any or all of network elements 14. For example, in addition to a CLI interface, network elements 14 also provide interfaces for receiving scripts that specify the commands in accordance with a scripting language. In a sense, the scripts may be output by controller device 10 to automatically invoke corresponding remote procedure calls (RPCs) on the managed network elements 14. The scripts may conform to, e.g., extensible markup language (XML) or another data description language.

Administrators 12 use controller device 10 to configure network elements 14 to specify certain operational characteristics that further the objectives of administrators 12. For example, administrators 12 may specify, for network element 14A, a particular operational policy regarding security, device accessibility, traffic engineering, quality of service (QOS), network address translation (NAT), packet filtering, packet forwarding, rate limiting, or other policies. Controller device 10 uses one or more network management protocols designed for management of configuration data within network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741 December 2006, available at tools.ietf.org/html/rfc4741. Controller device 10 may establish NETCONF sessions with one or more of network elements 14.

Controller device 10 may be configured to compare a new intent data model to an existing (or old) intent data model, determine differences between the new and existing intent data models, and apply the reactive mappers to the differences between the new and old intent data models. In particular, controller device 10 determines whether the new set of configuration data includes any additional configuration parameters relative to the old intent data model, as well as whether the new set of configuration data modifies or omits any configuration parameters that were included in the old intent data model.

The intent data model may be a unified graph model, while the low-level configuration data may be expressed in YANG, which is described in Bjorklund, "YANG—A Data Modeling Language for the Network Configuration Protocol (NETCONF)," Internet Engineering Task Force, RFC 620 October 2010, available at tools.ietf.org/html/rfc6020. In some examples, the intent data model may be expressed in YAML Ain't Markup Language (YAML). Controller device 10 may include various reactive mappers for translating the intent data model differences. These functions are configured to accept the intent data model (which may be expressed as structured input parameters, e.g., according to YANG or YAML). The functions are also configured to output respective sets of low-level device configuration data changes, e.g., device configuration additions and removals. That is, $y_1=f_1(x)$, $y_2=f_2(x)$, . . . $y_N=f_N(x)$.

Controller device 10 may use YANG modeling for intent data model and low-level device configuration models. This data may contain relations across YANG entities, such as list items and containers. Conventionally, controller devices do not support configuration management functions in real time. As discussed in greater detail below, controller device 10 may convert a YANG data model into a database model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller device 10 may receive data from one of administrators 12 representing any or all of create, update, and/or delete actions with respect to the unified intent data model. Controller device 10 may be configured to use the same compilation logic for each of create, update, and delete as applied to the graph model.

In general, controllers like controller device 10 use a hierarchical data model for intents, low-level data models, and resources. The hierarchical data model can be based on YANG or YAML. The hierarchical data model can be represented as a graph, as discussed above. Modern systems have supported intents to ease the management of networks. Intents are declarative. To realize intents, controller device 10 attempts to select optimal resources.

Techniques described herein are directed to splitting up a collector system into edge devices 16 (e.g., geographically collocated with network devices 14) and a collector device 20 (e.g., a cloud-instance). Edge devices 16 may perform a first portion (e.g., filtering, aggregation, compression) of a collector pipeline and collector device 20 may perform the rest of the collector pipeline. Collector device 20 may be located in a private cloud or a public cloud. In some examples, edge devices 16 may perform filtering, aggregation, and compression as well as use TCP-based communication for communications from edge device 16 to collector device 20, which may be more reliable compared to UDP-based communication that may be used for communications between network devices 14 and edge device 16. Techniques described herein may further include selecting an edge device from a plurality of edge devices 16 based on one or more a geolocation, an RTT signal, a collection type (e.g., polling or streaming), a stability, or a loading of each edge device.

In accordance with the techniques of the disclosure, collector device 20 may configure edge device 16 to collect telemetry flow data output by network devices 14 and to generate processed telemetry flow data based on the collected telemetry flow data. For example, collector device 20 may configure edge device 16 to perform one or more of filtering, aggregating, or compressing the telemetry flow data, which may help to minimize an up link utilization and/or saturation. In this example, collector device 20 may receive the processed telemetry flow data from edge device 16. Collector device 20 may store an indication of the processed telemetry flow data. Controller device 20 may analyze the processed telemetry flow data. For example, controller device 20 may apply one or more queries on the processed telemetry flow data to generate query responses. Controller device 10 may control enterprise network 2 based on the query responses.

Figure 2:
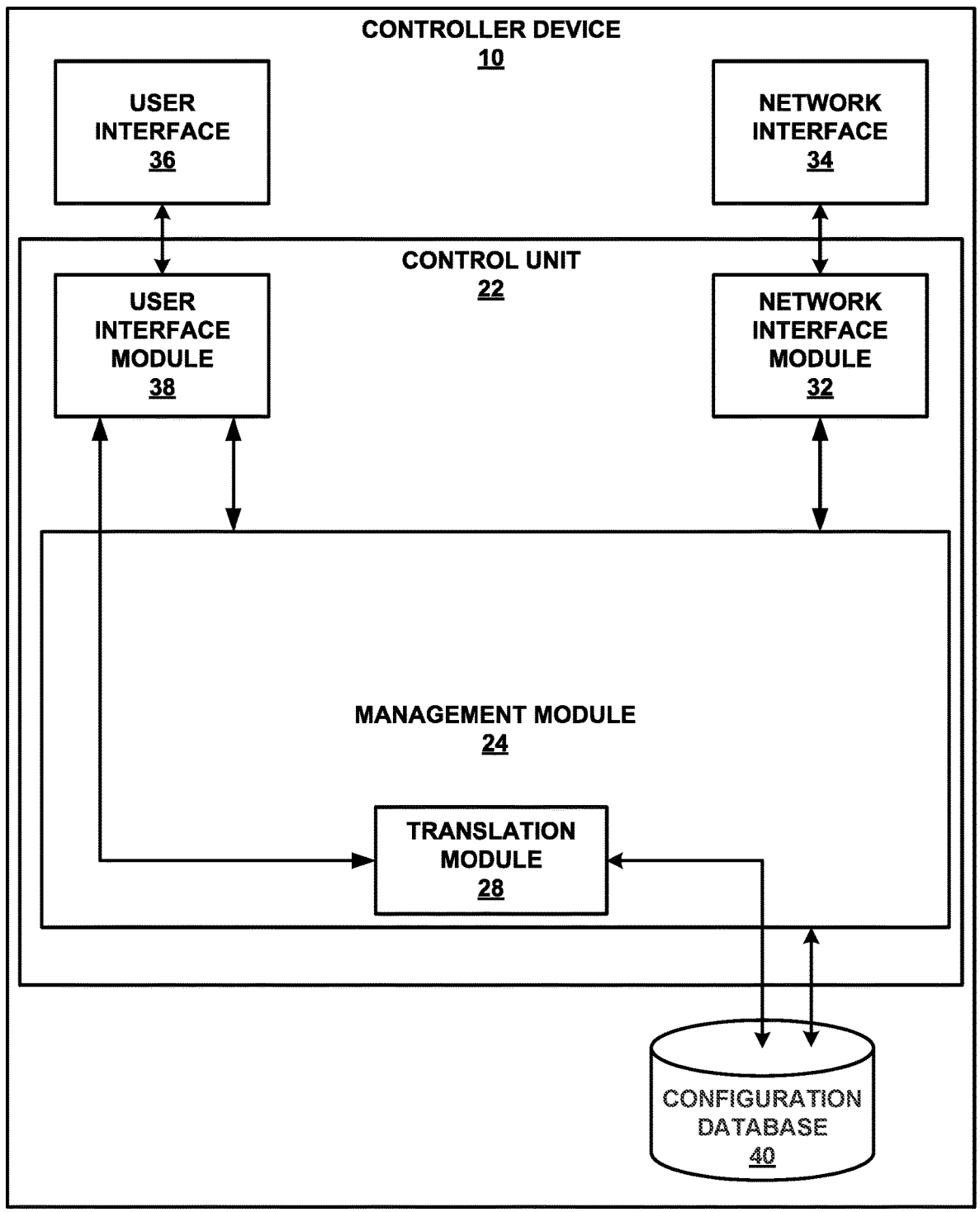
FIG. 2 is a block diagram illustrating an example set of components for the controller device of FIG. 1.

FIG. 2 is a block diagram illustrating an example set of components for controller device 10 of FIG. 1. In this example, controller device 10 includes control unit 22, network interface 34, and user interface 36. Network interface 34 represents an example interface that can communicatively couple controller device 10 to an external device, e.g., one of network elements 14 of FIG. 1 Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller device 10 may include multiple network interfaces in various examples, although only one network interface is illustrated for purposes of example.

Control unit 22 represents any combination of hardware, software, and/or firmware for implementing the functionality attributed to control unit 22 herein and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrators 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, administrators 12 need not directly interact with controller device 10, but instead may access controller device 10 remotely, e.g., via network interface 34.

Control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Functionality of control unit 22 may be implemented as one or more processing units in fixed or programmable digital logic circuitry. Such digital logic circuitry may include one or more microprocessors, digital signal processors (DSPs), application specific integrated circuits (ASICs), field programmable gate arrays (FPGAs), or any other equivalent integrated or discrete logic circuitry, as well as any combination of such components. When implemented as programmable logic circuitry, control unit 22 may further include one or more computer readable storage media storing hardware or firmware instructions to be executed by processing unit(s) of control unit 22.

Control unit 22 executes management module 24 to manage various network devices, e.g., network elements 14 of FIG. 1. Management of a network device includes, for example, configuring the network devices according to instructions received from a user (e.g., administrators 12 of FIG. 1) and providing the user with the ability to submit instructions to configure the network devices. Management of a network device further includes upgrading the network device with updated software, such as an updated software image.

Management module 24 is configured to receive intent unified-graph-modeled configuration data for a set of managed network devices from a user, such as administrators 12. Such intent unified-graph-modeled configuration data may be referred to as an "intent data model." Over time, the user may update the configuration data, e.g., to add new services, remove existing services, or modify existing services performed by the managed devices. The unified intent data model may be structured according to, e.g., YANG or YAML. The graph model may include a plurality of vertices connected by edges in a hierarchical fashion. In YANG, edges of graph models are represented though "leafref" elements. In the case of YAML, such edges may be represented with a "ref" edge. Similarly, parent to child vertex relations can be represented with a "has" edge. For example, a vertex for Element A refers to a vertex for Element B using a has-edge can be understood to mean, "Element A has Element B." In some examples, management module 24 also provides the user with the ability to submit reactive mappers that translation module 28 executes to transform the intent data model to device-specific, low-level configuration instructions.

Controller device 10 also includes configuration database 40. Configuration database 40 may include a data structure describing managed network devices, e.g., network elements 14. Configuration database 40 may act as an intent data store, which may be used to persist and manage collections of intent data models. For example, configuration database 40 may include information indicating device identifiers (such as MAC and/or IP addresses), device type, device vendor, devices species (e.g., router, switch, bridge, hub, etc.), or the like. Configuration database 40 also stores current configuration information (e.g., intent data model, or in some cases, both intent data model and low-level configuration information) for the managed devices (e.g., network elements 14). Configuration database 40 may include a database that comprises a unified intent data model. In some examples, configuration database 40 may store a low level configuration that includes, for each respective owned resource of a set of owned resources, a pointer indicating an owner for the respective owned resources of network elements 14.

Management module 24 may maintain a data structure in configuration database 40. The data structure may include a plurality of vertices and a plurality of edges, each vertex of the plurality of vertices representing a respective network device of a plurality of network devices (e.g., network elements 14) or a respective stateless intent of a plurality of stateless intents, and the plurality of edges defining relationships between the plurality of vertices. Management module 24 may receive an indication of a stateful intent. For example, management module 24 may receive intent unified-graph-modeled configuration data for a set of managed network devices from a user, such as administrator 12.

Although user interface 36 is described for purposes of example as allowing administrators 12 (FIG. 1) to interact with controller device 10, other interfaces may be used in other examples. For example, controller device 10 may include a representational state transfer (REST) client (not shown) that may act as an interface to another device, by which administrators 12 may configure controller device 10. Likewise, administrators 12 may configure network elements 14 by interacting with controller device 10 through the REST client.

Management module 24 may model configuration database 40 as a graph database representing YANG configuration data elements. YANG specifies various types of data structures, including lists, leaflists, containers, containers with presence, and features. Management module 24 may model each of lists, containers, containers with presence, and features, as well as a top-level container, as vertices in a graph database. Alternatively, configuration database 40 may represent YAML configuration data elements.

After constructing a graph database, management module 24 may perform operations on data of the graph database. For example, management module 24 may map Netconf-based operations, such as get-config, get-config with filters, and edit-config, to graph query language queries, such as Gremlin queries. Gremlin is described in GremlinDocs at gremlindocs.spmallette.documentup.com and in github.com/tinkerpop/gremlin/wiki. Management module 24 may execute conditions mapped to vertices and edges of the graph database if the condition attributes are changed. In response to the conditions, management module 24 may process additional changes, handled as functions as discussed in greater detail below. Management module 24 may further update all changes in transaction semantics.

Figure 3:
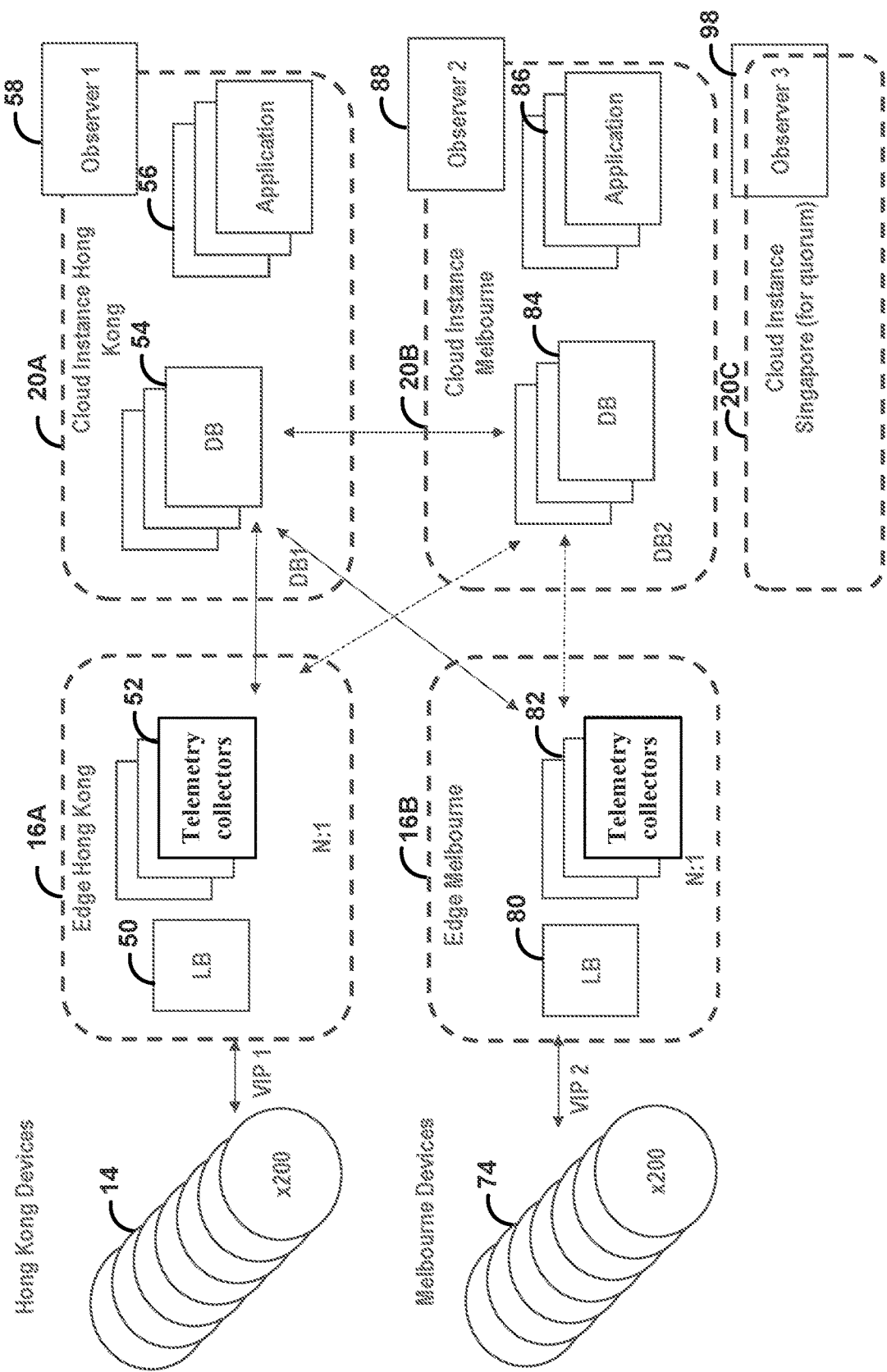
FIG. 3 is a block diagram illustrating an example of edge devices and a collector device, in accordance with the techniques of the disclosure.

FIG. 3 is a block diagram illustrating an example of edge devices and a collector device for processing telemetry packets, in accordance with the techniques of the disclosure. FIG. 3 is discussed with respect to FIGS. 1-2 for example purposes only. In this example, cloud instances 20A, 20B, 20C (collectively, "collector device 20") may determine which network devices 14, 74 are associated with which one of edge devices 16A, 16B (collectively, "edge devices 16"). For example, cloud instance 20A may determine that network devices 14 are associated with edge device 16A and cloud instance 20B may determine that network devices 74 are associated with edge device 16B. For example purposes only, cloud instance 20A select edge device 16A. However in some examples, cloud instance 20A may select edge device 16B or another edge device.

Network devices 14, 74 may send to telemetry data to one or more of edge devices 16. In the example of FIG. 3, edge devices 16 may each be implemented through a cluster of individual Kubernetes worker nodes and/or pods. Nodes and/or pods within each one of edge devices 16 can be susceptible to failure, so in some examples, the setup for each of edged devices can be provisioned with "N:1" redundancy. This may enable each of edge devices 16 to continue collecting telemetry data even if one or more nodes within a given edge device 16 fail. However, if a data-center hosting edge device 16A fails, then telemetry data cannot be connected from the network devices 14 associated with edge device 16A until the data center and associated connectivity is restored.

Observer 58 may detect a link failure between device-groups of network devices 14 to edge device 16A, from edge device 16A to cloud instance 20A, and from cloud instance 20A to a backup (e.g., collector device 20B). Observer 58 may determine whether cloud instance 20A, cloud instance 20B, cloud instance 20C of collector device 20 should be a primary instance or a backup instance for network devices 14. Each one of edge devices 16 may be configured by a respective primary instance of cloud instances 20A-20C. For instance, edge device 16A may be configured by cloud instance 20A. Cloud instance 20A may configure edge device 16A to perform one or more of filtering, aggregating, or compressing the telemetry flow data. In some examples, cloud instance 20A may configure telemetry collectors 52 to collect telemetry flow data from network devices 14. Cloud instance 20A may configure load balancer 50 (LB) to load balance telemetry collectors 52.

Edge device 16B may be configured by cloud instance 20B. Collector device 20 may synchronize data and configuration information from a primary instance of cloud instances 20A-20C to a backup instance of cloud instances 20A-20C. For instance, cloud instance 20A may synchronize data and configuration information to cloud instance 20B. Cloud instance 20B may synchronize data and configuration information to cloud instance 20A. While the above example refers to observer 58, observers 88, 98 may perform process similar to observer 58. For instance, observer 88 may detect a failure for cloud instance 20B and observer may detect a failure for cloud instance 20C.

Telemetry collectors 52 may be configured to process telemetry information (e.g., sFlow packets) output from network devices 14. Load balancer 50 may be configured to load balance telemetry collectors 52. Similarly, edge device 16B may include load balancer (LB) 80 and one or more telemetry collectors 82. Telemetry collectors 82 may be configured to process (e.g., filter, aggregate, and compress)

telemetry information (e.g., sFlow packets NetFlow packets, JTI Native Telemetry, OpenConfig, SNMP, Syslog, etc.) output from network devices 74 to generate processed telemetry information. Telemetry information may include information compliant with, for example, sFlow, NetFlow, JTI Native Telemetry, OpenConfig, SNMP, Syslog, or another protocol or telemetry mechanism. Techniques described herein for processing telemetry data may apply to any collected data irrespective of the protocol or the telemetry mechanism of the telemetry data. Load balancer 80 may be configured to load balance telemetry collectors 82.

Cloud instance 20A may include a database (DB) 54 and one or more applications 56. Database 54 may store the compressed telemetry information output by telemetry collectors 52. Application 56 may process the compressed telemetry information stored in database 54 to generate reports and/or to facilitate a control of network devices 14. Similarly, cloud instance 20B may include a database (DB) 84 and one or more applications 86. Database 84 may store the compressed telemetry information output by telemetry collectors 82. Application 86 may process the compressed telemetry information stored in database 84 to generate reports and/or to facilitate control of network devices 74.

In some examples, all configuration actions may be generated by a respective primary instance of cloud instances 20A-20C, which may be pushed to edge devices 16 (e.g., corresponding to new devices and/or playbooks). The respective primary instance of cloud instances 20A-20C may determine which network device is associated with which edge device of edge devices 16. For instance, cloud instance 20A may determine that network devices 14 are associated with edge device 16A. Cloud instance 20B may determine that network devices 74 are associated with edge device 16B. Network devices 14, 74 may send metric collection data to edge devices 16. For instance, network devices 14 may send metric collection data to edge device 16A. Network devices 74 may send metric collection data to edge device 16B. As suggested above, although individual Kubernetes worker nodes and/or pods within each edge device 16 can go down, the setup can be provisioned with "N:1" redundancy, thereby enabling the edge device to continue performing operations. However, if the data-center hosting the edge device goes down, then telemetry cannot be connected from the network devices associated with that edge device until the data center is operational.

Collector device 20 may select an edge device from among edge devices 16. For example, collector device 20 may leverage a multitude of signals like geo-location signals, RTT between Kubernetes worker nodes or from cloud instances 20A-20C to edge devices 16, a collection type, device meta-data, edge load, edge stability etc. to make intelligent and dynamic collection placement decisions. For each newly added network device, collector device 20 may compute a set of acceptable edge devices 16 based on one or more geographical restriction conditions. The signal in this example include one or more of a geographical location of the network device, a geo-location of edge devices 16, and a geo-location of the primary cloud instance of cloud instances 20A-20C ensuring that the data does not stray into unauthorized geo locations. For instance, collector device 20 might not assign network devices located in a first geographical region (e.g., a country) to the an edge device located in a second geographical region, where data is not authorized to be exchanged between the first geographical region and the second geographical region. For instance, collector device 20 (e.g., observer 58 of cloud instance 20A) may select edge device 16A based on a determination that edge device 16A, network devices 14, and cloud instance 20A satisfy a geographical restriction (e.g., are within a common geographical region or within different geographical regions where data exchange between the different geographical regions is authorized).

Collector device 20 may compute an RTT of a network device (e.g., one of network devices 14) to each edge device 16 in the set of acceptable edge devices (e.g., edge devices of edge devices 16 that satisfy a geographical restriction). Based on the RTT signal, collector device 20 may pick a "closest" edge device of edge devices 16. For instance, collector device 20 may select edge device 16A as the closest edge device in response to determining that the RTT signal for edge device 16A is less than the RTT signal for edge devices 16B, 16C. In the event of a failover, should the closest edge (device <-> edge connection) be deemed down by an observer quorum, collector device 20 may select a next nearest edge device (within the geographical constraints). For instance, collector device 20 may select edge device 16B as the closest edge device in response to determining that edge device 16A is deemed down and that the RTT signal for edge device 16B is less than the RTT signal for edge device 16C. That is, collector device 20 (e.g., observer 58 of cloud instance 20A) may select edge device 16A based on the RTT between a network device of network devices 14 and edge device 16A.

Collector device 20 may dynamically determine the RTT constraint based on the collection type signal (e.g., polling may be situated closer to prevent timeouts). Collector device 20 may intelligently determine the collection type signal based on the meta-data signal of the network device. The meta-data signal of the network device may include one or more of a vendor, a product, a platform, an operating system (OS), a version, which may form a "tuple". That is, collector device 20 (e.g., observer 58 of cloud instance 20A) may determine the RTT based on one or more of a vendor of the network device, a product type of the network device, a platform of the of the network device, an operating system (OS) provisioned at the network device, or a version of the network device. Collector 20 may apply the tuple to a current set of deployed playbooks signal (which determine the available collection types) to select an edge device from edge devices 16.

In addition, collector device 20 may determine an intermediate firewall and/or proxy issues that prevent some ingests from working through insights-debug-probes and use this as a signal to further refine the set of "working" ingest types from the "theoretically" supported ingest types. For example, collector device 20 (e.g., observer 58 of cloud instance 20A) may select edge device 16A is based on a determination that data is allowed to be exchanged between each network device of network devices 14 and edge device 16A (e.g., a firewall does not prevent the data to be exchanged and no proxy issues prevent the data to be exchanged).

Collector device 20 may use an overall load on an edge device (e.g., an aggregate of the individual Kubernetes worker nodes) as a signal before assigning collection to that edge device. For example, collector device 20 may select edge device 16A in response to determining that an overall load on edge device 16B exceeds a load threshold. For instance, collector device 20 (e.g., observer 58 of cloud instance 20A) may select edge device 16A based on a determination that an aggregated loading of telemetry collectors 52 of edge device 16A is less than a loading threshold. In this way, collector device 20 may apply intelligent load distribution done while adding a new network device to edge device mapping.

Collector device 20 may intelligently determine, in response to determining that the load on an edge device of edge devices 16 is above a loading threshold (e.g., because of workers going down) which set of network devices are to be transferred to other eligible edge devices that match the criteria of geographical policy, RTT requirements, and insights-debug-probes criteria to suggest a rebalance between edge devices 16. For example, in response to determining that the load (e.g., data collection load) on edge device 16A is above a loading threshold, collector device 20 may determine to transfer data collection responsibilities for a set of network devices 14 to edge devices 16B, 16C based on one or more of geographical policy, RTT requirements, or insights-debug-probes criteria. For instance, collector device 20 (e.g., observer 58 of cloud instance 20A) may select edge device 16B from edge devices 16 based on a determination that the aggregating loading of telemetry collectors 52 is greater than the loading threshold. In some examples, collector device 20 may reassign network devices to rebalance between edge devices 16 periodically, which may help to prevent a network device from being continually rebalanced between two edge devices. For example, collector device 20 (e.g., observer 58 of cloud instance 20A) may re-evaluate the selection of the selected edge device from edge devices 16 based on a change in end-to-end parameters (e.g., a determination that the aggregating loading of telemetry collectors 52 is greater than the loading threshold) and/or periodically re-evaluate the selection of the selected edge device from edge devices 16. For instance, after selecting edge device 16A, collector device 20 may select edge device 16B from edge devices 16 based on a change in end-to-end parameters for edge devices 16. In some instances, after selecting edge device 16A, collector device 20 may periodically reevaluate the selection of edge device 16A (e.g., using one or more of the criteria used to initially select the edge device).

Collector device 20 may select an edge device based on an overall stability of each edge device 16 to isolate and not assign collection to problematic edge devices when there is adequate capacity in the system and the RTT constraints to other edge devices are satisfied. For example, collector device 20 (e.g., observer 58 of cloud instance 20A) may select edge device 16A based on a stability of edge device 16A. For example, collector device 20 may determine the stability of an edge device based on one or more of metrics collected at an edge device (e.g., a connection state, a number of failures of telemetry collection, a jitter), cluster metrics (e.g., Kubernetes related), system metrics (e.g., a cpu usage, a memory usage), or other information. Collector device 20 may apply hysteresis and dampening of the stability signal to improve the accuracy of the stability estimation.

Collector device 20 may select an edge device based on a connection (e.g., RTT and/or packet-loss) between an edge device and a cloud instance RTT. If there is too much packet loss, collector device 20 may re-program the ingest on the edge device to either down sample the sensor-frequency on the network device, or to use periodic aggregation to send lesser data to ease congestion. For example, collector device 20 (e.g., observer 58 of cloud instance 20A) may select edge device 16A based on a RTT between edge device 16A and instance 20A of collector device 20.

Collector device 20 may select an edge device based on the tuple of {sensor-type, sensor-frequency, # metrics, cardinality}, which may directly impact Kubernetes resources on the edge device. For example, collector device 20 (e.g., observer 58 of cloud instance 20A) may select edge device 16A based on one or more of a sensor-type of a network device of set of network devices 14, a sensor-frequency of the network device, a number of metrics output by of network device, and a cardinality of the network device. In this way, collector device 20 may apply an intelligent placement between edge devices, which may factor in the contributing load imposed and move relatively large loads to other edge devices that satisfy the geographical policy, RTT requirement, and insights-debug-probe constraints to rebalance with the least changes in terms of disrupting metric collection.

When a new network device is added, collector device 20 may recommend that an administrator add an edge device that can meet the criteria (e.g., geographical policy, RTT requirement, and insights-debug-probe constraints). In some examples, collector device 20 may even consume a set of available compute nodes and/or hosts (not the telemetry devices, which could also be compute nodes/hosts) and use the recommend signal and the criteria (e.g., geographical policy, RTT requirement, and insights-debug-probe constraints) to determine a placement (e.g., a geographical placement) of a new edge based on the set of potential Kubernetes worker nodes available to form a cluster. For example, collector device 20 (e.g., observer 58 of cloud instance 20A) may output a recommendation to setup an edge device (e.g., edge device 16B, edge device 16C, or another edge device).

Collector device 20 may select an edge device based on the RTT between each Kubernetes worker node to all other worker nodes in that cluster, so that collector device 20 may track and ensure that the Kubernetes cluster never gets stretched beyond a latency threshold (e.g., 150 ms), where workload services may degrade. Similarly, while recommending a cluster composition for the newly proposed edge device, collector device 20 may select those Kubernetes worker nodes that are within a latency threshold (e.g., less than 150 ms) for that cluster. Should a cluster go down, collector device 20 may re-consider all the network devices handled by that cluster as new entrants and determine collection intelligent placement again.

FIG. 4A is a conceptual diagram illustrating an example of an initial selection of an edge device, in accordance with the techniques of the disclosure. FIG. 4A is discussed with respect to FIGS. 1-3 for example purposes only. Collector device 20 may apply an intelligent placement and telemetry path using a multitude of signals, such as, for example, a geo-location signal, RTT between Kubernetes worker nodes, a collection type, device meta-data, an edge device load, an edge device stability, or other signals. In this example, collector device 20 may generate an initial computed optimal metric collection based on the multitude of signals to select edge device 16A. In this example, however, the metric collection using edge device 16A may result in a relatively high RTT from edge device 16A to collector device 20.

FIG. 4B is a conceptual diagram illustrating an example of an updated selection of an edge device, in accordance with the techniques of the disclosure. FIG. 4B is discussed with respect to FIGS. 1-3 for example purposes only. Collector device 20 may intelligently compute and align an optimal collection of edge devices based on current signals (e.g., geographical policy, RTT requirement, and insights-debug-probe constraints). In this example, collector device 20 may select edge device 16B in response to observing the relatively high RTT from edge device 16A to collector device 20. For instance, collector device 20 may select edge device 16B if the RTT from edge device 16A to collector device 20 exceeds an RTT threshold.

Figure 5:
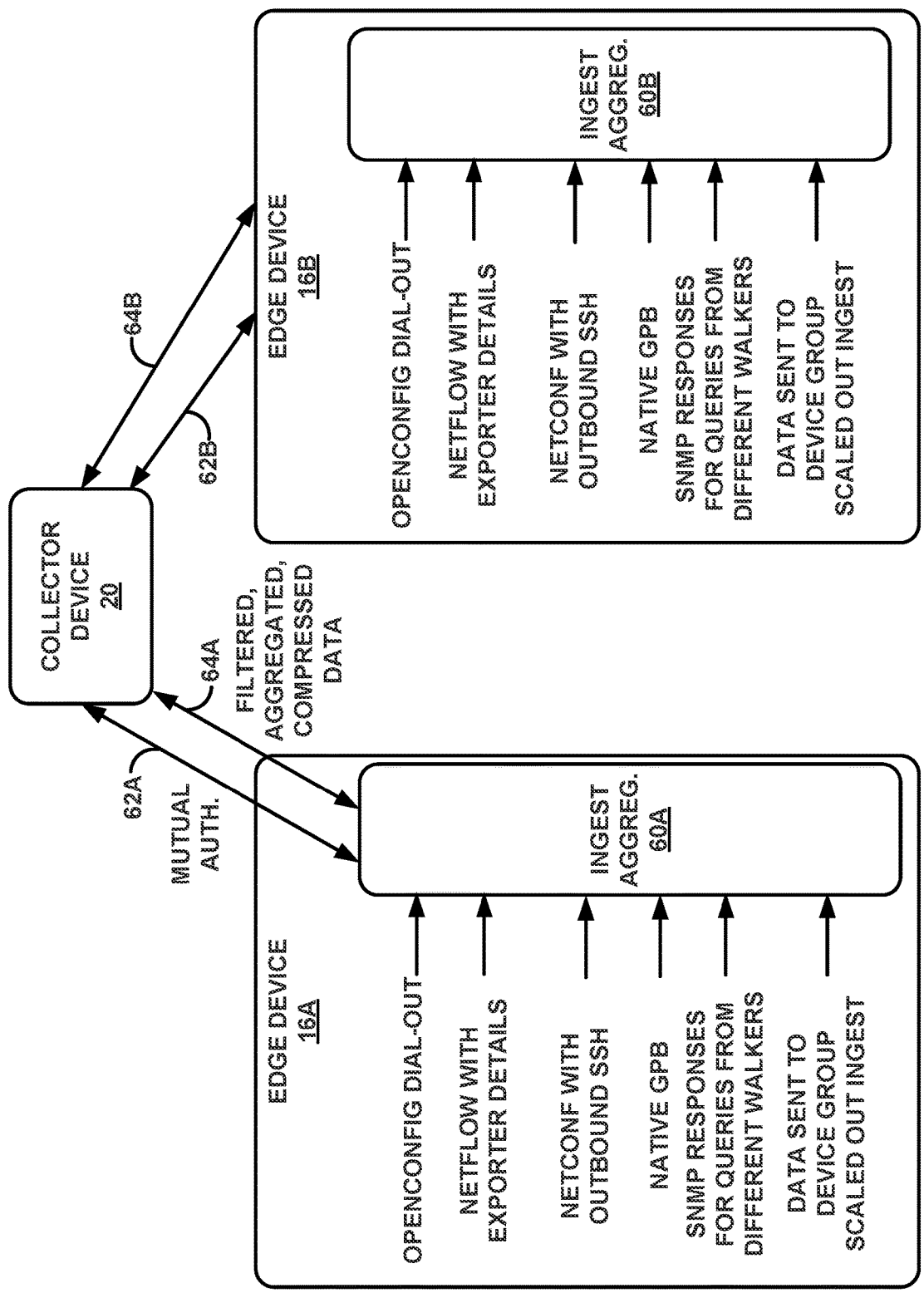
FIG. 5 is a block diagram illustrating example features of edge devices network, in accordance with the techniques of the disclosure.

FIG. 5 is a block diagram illustrating example features of edge devices on a network, in accordance with the techniques of the disclosure. FIG. 5 is discussed with respect to FIGS. 1-3, 4A, and 4B for example purposes only. In the example of FIG. 5, edge device 16A comprises an ingest aggregator 60A configured aggregate, filter, and/or compresses data and authenticate with a collector device. In the example of FIG. 5, ingest aggregator 60A may be configured to aggregate one or more of an open config dial-out, a NetFlow with exporter details, NETCONF with outbound SSH, native GPB, SNMP responses for queries from different walkers, or data sent to device group scaled out ingest. Collector device 20 and edge device 16A may perform mutual authentication 62A and ingest aggregator 60A may output the filtered, aggregated, compressed data 64A. Similarly, edge device 16B comprises an ingest aggregator 60B configured to aggregate one or more of an open config dial-out, a NetFlow with exporter details, netconf with outbound SSH, native GPB, SNMP responses for queries from different walkers, or data sent to device group scaled out ingest. Collector device 20 and edge device 16B may perform mutual authentication 62B and ingest aggregator 60A may output the filtered, aggregated, compressed data 64B.

Figure 6:
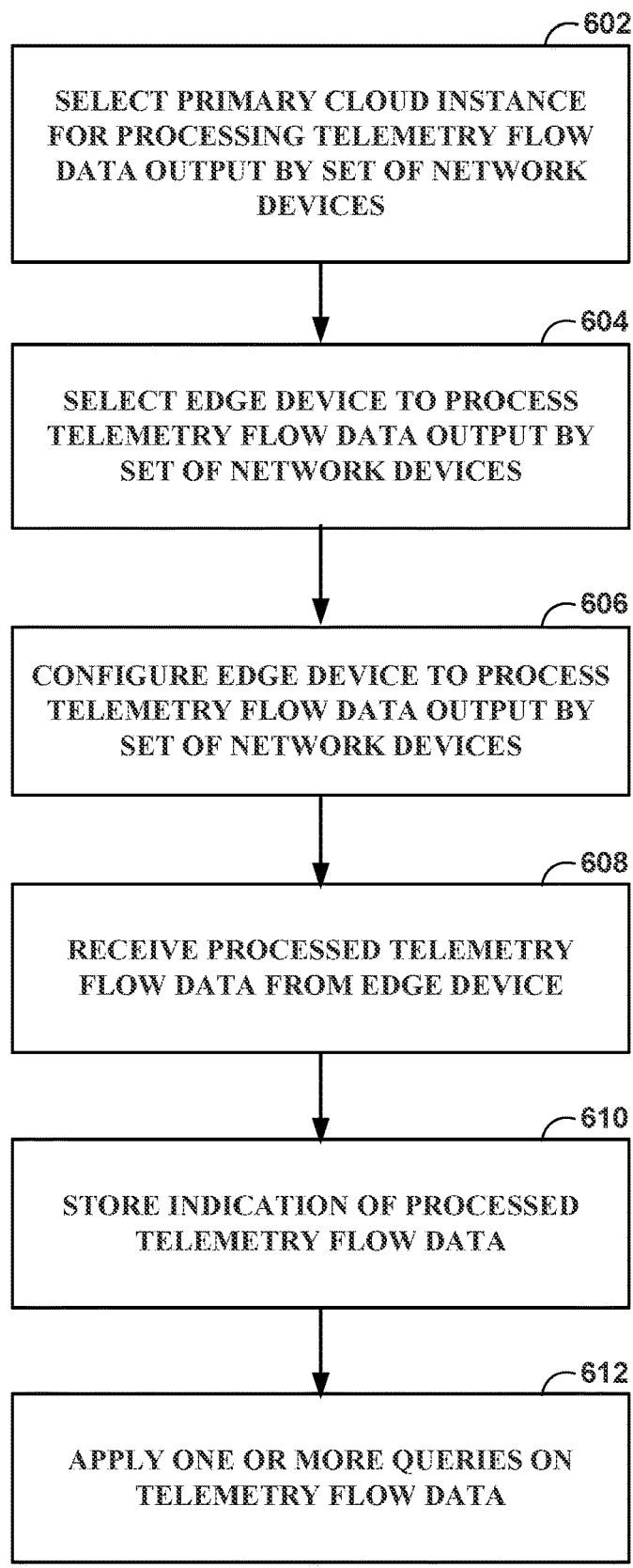
FIG. 6 is a flow chart illustrating an example process, in accordance with the techniques of the disclosure.

FIG. 6 is a flow chart illustrating an example process for selecting an edge device, in accordance with the techniques of the disclosure. FIG. 6 is discussed with respect to FIGS. 1-3, 4A, 4B, 5, and 6 for example purposes only. Controller device 20 may select a primary cloud instance for processing telemetry flow data output by a set of network devices (602). For example, controller device 20 may select cloud instance 20A as a primary cloud instance for processing telemetry flow data output by network devices 14. In some examples, controller device 20 may select a backup cloud instance for processing telemetry flow data output by the set of network devices. For example, controller device 20 may select cloud instance 20B as a backup cloud instance for processing telemetry flow data output by network devices 14.

Controller device 20 may select an edge device to process the telemetry flow data output by the set of network devices (604). For example, controller device 20 may select edge device 16A to process telemetry flow data output by network devices 14. For instance, controller device 20 may select edge device 16 based on one or more of a geographical policy, an RTT requirement, or an insights-debug-probe constraint.

Controller device 20 may configure the edge device to process the telemetry flow data output by the set of network devices (606). Controller device 20 may receive the processed telemetry flow data from the edge device (608). Controller device 20 may store an indication of the processed telemetry flow data (610). Controller device 20 may apply one or more queries on the telemetry flow data (612). For instance, controller device 20 may analyze (e.g., apply a query to) the stored indication of the processed telemetry flow data and may perform one or more actions (e.g., output one or more results of the query) based on the analyzing of the stored indication of the processed telemetry flow data.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A method comprising:
   determining, by a collector device, a round-trip time (RTT) signal between a network device of a plurality of network devices and an edge device based on one or more of a vendor of the network device, a product type of the network device, a platform of the network device, an operating system (OS) provisioned at the network device, or a version of the network device, wherein the edge device is configurable to perform one or more of filtering, aggregating, or compressing of telemetry flow data output by the plurality of network devices to generate processed telemetry flow data and to output the processed telemetry flow data to the collector device;
   selecting, by the collector device and based on the RTT signal, the edge device from a plurality of edge devices;
   configuring, by the collector device, the edge device to collect the telemetry flow data output by the plurality of network devices and to generate the processed telemetry flow data based on the collected telemetry flow data, wherein configuring the edge device to generate the processed telemetry flow data comprises configuring the edge device to perform one or more of filtering, aggregating, or compressing the telemetry flow data;

receiving, by the collector device, the processed telemetry flow data from the edge device; and storing, by the collector device, an indication of the processed telemetry flow data.

2. The method of claim 1, wherein configuring the edge device to collect the telemetry flow data output by the plurality of network devices comprises configuring a plurality of telemetry collectors to collect the telemetry flow data.

3. The method of claim 2, wherein configuring the edge device to collect the telemetry flow data output by the plurality of network devices comprises configuring the edge device to load balance the plurality of telemetry collectors.

4. The method of claim 1,
wherein selecting the edge device is based on the RTT signal and further based on a determination that the edge device, the plurality of network devices, and an instance of the collector device, satisfy a geographical restriction; and
wherein the instance of the collector device is configured to receive the processed telemetry flow data and to store the indication of the processed telemetry flow data.

5. The method of claim 1, wherein selecting the edge device is based on the RTT signal and further based on whether a collection type for the edge device comprises polling or streaming.

6. The method of claim 1, wherein selecting the edge device is based on the RTT signal and further based on a determination that data is allowed to be exchanged between each network device of the plurality of network devices and the edge device.

7. The method of claim 1, wherein selecting the edge device is based on the RTT signal and further based on a determination that an aggregated loading of a plurality of telemetry collectors of the edge device is less than a loading threshold.

8. The method of claim 7, wherein the edge device is a first edge device, the method comprising, after storing the indication of the processed telemetry flow data, selecting a second edge device from the plurality of edge devices based on a determination that the aggregating loading of the plurality of telemetry collectors on the first edge device is greater than the loading threshold.

9. The method of claim 1, wherein selecting the edge device is based on the RTT signal and further based on a stability of the edge device.

10. The method of claim 1, wherein selecting the edge device is based on the RTT signal and further based on a round-trip time (RTT) between the edge device and an instance of the collector device.

11. The method of claim 1, wherein selecting the edge device is based on the RTT signal and further based on one or more of a sensor-frequency of the network device, a number of metrics output by the network device, or a cardinality of the network device.

12. The method of claim 1, wherein selecting the edge device comprises outputting a recommendation to setup the edge device.

13. The method of claim 1, further comprising, after selecting the edge device, selecting, by the collector device, a second edge device from the plurality of edge devices based on a change in end-to-end parameters.

14. The method of claim 1, further comprising, after selecting the edge device, periodically reevaluating, by the collector device, the selection of the edge device.

15. The method of claim 1, further comprising:
analyzing, by the collector device, the stored indication of the processed telemetry flow data; and
performing, by the collector device, one or more actions based on the analyzing of the stored indication of the processed telemetry flow data.

16. The method of claim 1, wherein the telemetry flow data comprises sFlow packets.

17. A device comprising a datastore and processing circuitry, wherein the processing circuitry is configured to:
determine a round-trip time (RTT) signal between a network device of a plurality of network devices and an edge device based on one or more of a vendor of the network device, a product type of the network device, a platform of the network device, an operating system (OS) provisioned at the network device, or a version of the network device, wherein the edge device is configurable to perform one or more of filtering, aggregating, or compressing of telemetry flow data output by a plurality of network devices to generate processed telemetry flow data and to output the processed telemetry flow data to the device;
select, based on the RTT signal, the edge device from a plurality of edge devices;
configure the edge device to collect the telemetry flow data output by the plurality of network devices and to generate the processed telemetry flow data based on the collected telemetry flow data, wherein to configure the edge device to generate the processed telemetry flow data, the processing circuitry is configured configure the edge device to perform one or more of filtering, aggregating, or compressing the telemetry flow data;
receive the processed telemetry flow data from the edge device; and
store an indication of the processed telemetry flow data at the datastore.

18. Non-transitory computer-readable storage media including one or more instructions that cause processing circuitry to:
determine a round-trip time (RTT) signal between a network device of a plurality of network devices and an edge device based on one or more of a vendor of the network device, a product type of the network device, a platform of the network device, an operating system (OS) provisioned at the network device, or a version of the network device, wherein the edge device is configurable to perform one or more of filtering, aggregating, or compressing of telemetry flow data output by a plurality of network devices to generate processed telemetry flow data and to output the processed telemetry flow data to a collector device;
select, based on the RTT signal, the edge device from a plurality of edge devices;
configure the edge device to collect the telemetry flow data output by the plurality of network devices and to generate the processed telemetry flow data based on the collected telemetry flow data, wherein to configure the edge device to generate the processed telemetry flow data, the one or more instructions cause the processing circuitry to configure the edge device to perform one or more of filtering, aggregating, or compressing the telemetry flow data;
receive the processed telemetry flow data from the edge device; and
store an indication of the processed telemetry flow data at a datastore.

* * * * *